United States Patent [19]

Alsaker

[11] Patent Number: 4,653,198
[45] Date of Patent: Mar. 31, 1987

[54] PLANT FOR DRYING ANIMAL OR VEGETABLE MATERIAL

[75] Inventor: Jon Alsaker, Rådal, Norway

[73] Assignee: Stord Bartz A/S, Bergen, Norway

[21] Appl. No.: 673,338

[22] PCT Filed: Apr. 5, 1984

[86] PCT No.: PCT/NO84/00018
§ 371 Date: Nov. 7, 1984
§ 102(e) Date: Nov. 7, 1984

[87] PCT Pub. No.: WO84/03935
PCT Pub. Date: Oct. 11, 1984

[30] Foreign Application Priority Data
Apr. 6, 1983 [NO] Norway ............................. 831211

[51] Int. Cl.⁴ .............................................. F26B 3/28
[52] U.S. Cl. ............................................ 34/35; 34/86; 34/213; 34/216
[58] Field of Search .................... 34/35, 86, 169, 209, 34/213, 216

[56] References Cited
U.S. PATENT DOCUMENTS 2,622,342 12/1952 Goulounes et al. ................. 34/169
4,223,452 9/1980 Chambers .............................. 34/35
4,231,165 11/1980 Gresens et al. ....................... 34/86
4,255,870 3/1981 Malmquist .............................. 34/35
4,312,136 1/1982 Bahner et al. .......................... 34/35
4,490,924 1/1985 Lambert ................................. 34/86

Primary Examiner—Larry I. Schwartz
Attorney, Agent, or Firm—Kenyon & Kenyon

[57] ABSTRACT

A plant for heat treating animal or vegetable material comprises apparatuses for two-stage or multi-stage heat treatment. A heat medium which is used in a second heat treatment apparatus (2), which follows a first heat treatment apparatus (1), consists of uncontaminated water/steam which is circulated in a closed circuit, that is to say separated from the heat medium of the first apparatus and from the treatment material of the second apparatus. The closed circuit extends from heat exchanger surfaces, which are supplied with heat energy from exhaust gas/exhaust steam from the first apparatus (1), via heat surfaces of the second apparatus (2) back to said heat exchanger surfaces. The closed circuit includes one or more steam compressor(s) (17) in order to bring in a manner known per se the heat medium of the circuit up to the process steam pressure before it is supplied to the heat surfaces of the second apparatus (2).

9 Claims, 1 Drawing Figure

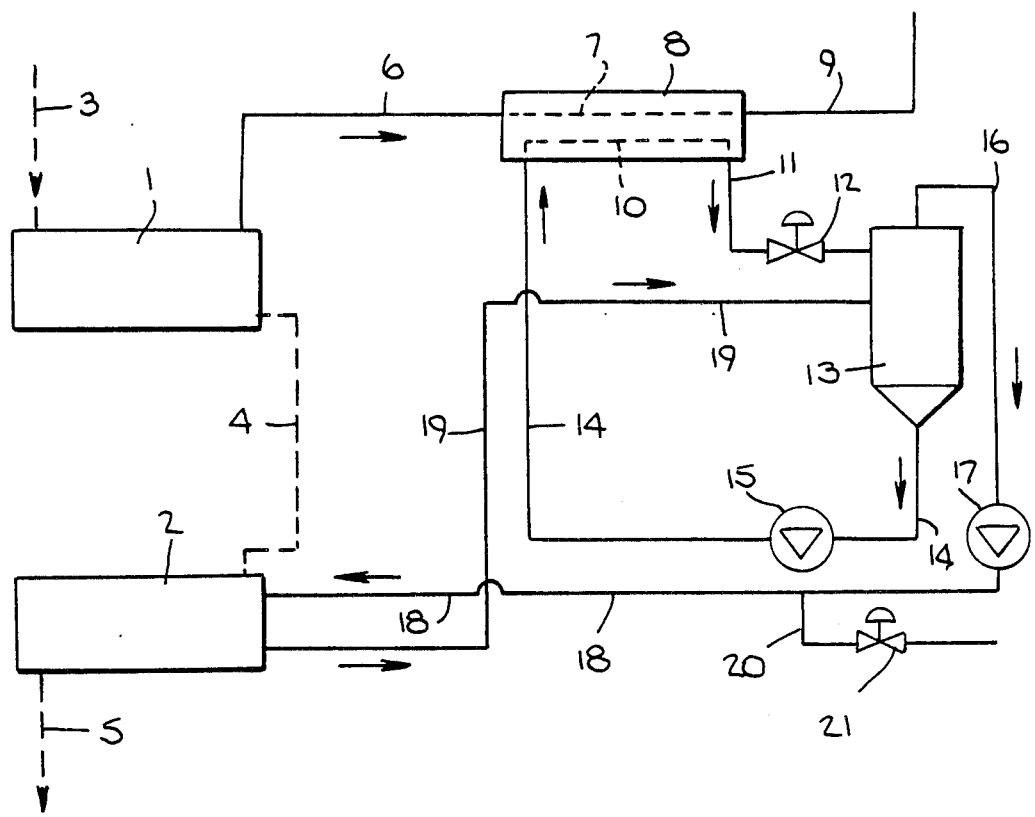

PLANT FOR DRYING ANIMAL OR VEGETABLE MATERIAL

The present invention relates to a plant for drying animal or vegetable material, comprising apparatuses for two-stage or multi-stage heat treatment, preferably separate apparatuses for successive heat treatment of the material.

It is well known within various branches of industry to employ waste heat from a first heat treatment apparatus—in the form of recompressed exhaust steam—in a subsequent heat treatment apparatus. In known process techniques the waste heat is usually employed in the form of impure exhaust gas or impure process exhaust steam, and such known, secondary heat medium as a consequence of the impurities in the exhaust steam or exhaust gas from the first heat treatment apparatus place special material technical demands on compressor(s) and on remaining process apparatus for the said subsequent heat treatment apparatus. These special demands involve complicated and expensive apparatus.

The main object of the plant according to the invention is to obtain a possibility for employing compressors and other apparatus which is simple and inexpensive in procurement as well as in use.

The plant according to the invention is characterised in that a heat medium which is used in a second heat treatment apparatus, which follows a first heat treatment apparatus, consists of uncontaminated water/steam which is circulated in a closed circuit, that is to say separated from the heat medium of the first apparatus and from the treatment material of the second apparatus. The closed circuit extends from heat exchanger surfaces, which are supplied with heat energy from the exhaust gas/exhaust steam from the first apparatus, via heat surfaces in the second apparatus back to the heat exchanger surfaces. The closed circuit includes one or more steam compressor(s) in order to bring in a manner known per se the heat medium of the circuit up to the process steam pressure before it is supplied to the heat surfaces of the second apparatus.

By employing a secondary heat medium circuit, based on uncontaminated water which is circulated in a closed circuit, the problems with the impurities in the exhaust steam or the exhaust gas from the first heat treatment apparatus are avoided. Thus, equipment of conventional construction materials, such as soft steel, can thereby be employed in the second apparatus. In other words, corrosion of the material can be avoided at the surfaces which are only exposed to uncontaminated water and uncontaminated water vapor, respectively. In addition, such process-associated disturbances are avoided which are due to carried along particles, carried along impure fluid drops, scum formations, and the like.

Even if the plant requires extra energy for operating a pump and compressor in the closed circuit, operatively economic favorable results are obtained as a consequence of the advantages of using uncontaminated water/steam in the closed circuit.

The invention will be further described in the following description having regard to the accompanying drawing, which illustrates a process diagram according to the invention.

The plant according to the invention, as illustrated in the accompanying drawing comprises two heat treatment apparatuses 1 and 2. By broken lines there is shown, respectively, a feed conduit 3 for the material which is to be treated in the apparatus 1, a transfer conduit 4 for the material between the apparatus 1 and the apparatus 2 together with a discharge conduit 5 from the apparatus 2 for the material. If desired, there can be present in series with the apparatus 2 or in series with the apparatus 1 one or more additional apparatuses (not shown further). The apparatus 2 and possible further apparatuses effect heating of the material or portions of the latter by means of waste heat from the apparatus 1.

The two heat treatment apparatus 1, 2 are thus connected in series relative to the flow of the material to be treated. In addition, a conduit 6 extends from the upstream heat treatment apparatus 1 for exhaust gas or exhaust steam or a mixture of exhaust gas and exhaust steam from the apparatus 1. The conduit 6 leads the gas/steam via a primary duct 7 in a heat exhanger 8 to a discharge conduit 9 to a collection location (not shown).

The heat exchanger 8 has a secondary duct 10 which is included in a separate, closed circuit for uncontaminated water/water vapor which is supplied heat in the heat exchanger 8 from the gas/stream waste heat duct of the primary side. A conduit 11 extends from the the secondary duct 10 in the heat exchanger via a regulating valve 12 to the upper portion of a flash tank 13.

The conduit 11 serves to deliver water which has been heated in the heat exchanger 8 to the flash tank 13. From the bottom of the flash tank 13 there extends a return conduit 14 via a pump 15 back to the secondary duct 10 in the heat exchanger 8, so that by repeated circulation of water from the tank 13 to the heat exchanger duct 10, the temperature of the circulating water can be increased. Water vapor is drawn outwardly from the top flash tank 13 via a conduit 16 which passes to a compressor 17 which brings the pressure of the water vapor upwards from a pressure of below 1.5 bar (absolute pressure) to process steam pressure.

In the conduit 6 between the heat treatment apparatus 1 and the heat exchanger 8, one operates with an exhaust gas temperature of between 80° and 100° C. at a pressure of 0.8 to 1.5 bar (dependent upon which medium one dries in the heat treatment apparatus 1). In the conduit 16 between the flash tank 13 and the compressor 17, one operates correspondingly with a temperature of betwen 60° and 100° C. and at a pressure of 0.2 to 1 bar. In a conduit 18 between the compressor 17 and the second heat treatment apparatus 2, one operates at a pressure of between 1.0 and 4.0 bar, depending upon the type and number of compressors.

Water vapor at process steam pressure is thus led from the compressor 17 via the conduit 18 to the heat treatment apparatus 2 and—still in a closed circuit—through the apparatus 2 and outwardly from the latter in the form of exhaust steam and condensate via a conduit 19 back to the tank 13. By means of the closed heat medium circuit, in which uncontaminated water and steam circulate respectively, conduits 11, 14, 16, 18, 19 together with valve 12, tank 13, pump 15 and compressor 17 can be made of conventional construction materials (for example soft steel). The metal in or the contact surfaces in the heat exchanger 8 and in the apparatus 2, respectively, can on the other hand be of special construction with respect to the contacts with the medium in the primary duct 7 and the contact with the material which is to be heat treated in the apparatus 2, repectively.

A ventilation conduit 20 with associated ventilation valve 21 extends from the conduit for venting the secondary heat medium circuit of the plant.

The invention thus provides a plant and a method for drying a flow of material which is able to utilize the waste heat energy from one heat treatment apparatus in an economically favorable manner.

I claim:

1. A method of drying a flow of material comprising the steps of passing the flow of material sequentially through at least two heat treatment apparatus;

exhausting hot waste gas from one of the heat treatment apparatus;

passing the hot waste gas in heat exchange relation with a flow of water circulating in a first circuit to heat and water and to generate water vapor therein;

separating a flow of water vapor from the heated water in the circuit;

passing the flow of water vapor in a second circuit through the second heat treatment apparatus to heat the flow of material therein and thereafter return the flow of vapor to the first circuit; and compressing the flow of water vapor in the second circuit upstream of the second heat treatment apparatus.

2. A process as set forth in claim 1 wherein the flow of water vapor in the second circuit is compressed to a pressure between 1.0 and 4.0 bar.

3. A process as set forth in claim 2 wherein the flow of water vapor from the first circuit is at a temperature between 60° C. and 100° C.

4. A process as set forth in claim 3 wherein the flow of hot waste gas from the first heat treatment apparatus is at a temperature between 80° C. and 100° C. and a pressure of 0.8 to 1.5 bar.

5. A plant for drying animal or vegetable material comprising at least two heat treatment apparatus connected in series relative to a flow of the material therethrough;

a conduit extending from one of said heat treatment apparatus for exhausting waste gas therefrom;

a first circuit for circulating a flow of water therethrough;

a heat exchanger between said conduit and said first circuit for transferring heat from waste gas flowing in said conduit to water flowing in said conduit to heat at least a part of the water to water vapor; and a second circuit connected to said first circuit and with the other of said heat treatment apparatus to receive and convey a flow of water vapor from said first circuit through said other heat treatment apparatus in heat exchange relation with the material flowing therethrough.

6. A plant as set forth in claim 5 wherein said first circuit includes a tank for receiving a flow of heated water and water vapor downstream of said heat exchanger and said second circuit is connected to said tank to receive a flow of water vapor therefrom.

7. A plant as set forth in claim 6 wherein said first circuit includes a pump for circulating water therethrough.

8. A plant as set forth in claim 7 wherein said second circuit includes a compressor for compressing the flow of water vapor upstream of said other heat treatment apparatus.

9. A plant as set forth in claim 5 wherein said second circuit includes a compressor for compressing the flow of water vapor upstream of said other heat treatment apparatus.

* * * * *